(12) United States Patent
Lee et al.

(10) Patent No.: US 12,429,682 B2
(45) Date of Patent: Sep. 30, 2025

(54) PLENOPTIC MICROSCOPE SYSTEM AND PLENOPTIC IMAGE PROCESSING APPARATUS

(71) Applicant: ELECTRONICS AND TELECOMMUNICATIONS RESEARCH INSTITUTE, Daejeon (KR)

(72) Inventors: Munseob Lee, Daejeon (KR); Chihoon Kim, Daejeon (KR); Sang Yun Kim, Daejeon (KR); Ji Won Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 112 days.

(21) Appl. No.: 18/237,688

(22) Filed: Aug. 24, 2023

(65) Prior Publication Data

US 2024/0103259 A1    Mar. 28, 2024

(30) Foreign Application Priority Data

Sep. 23, 2022  (KR) .................. 10-2022-0120895
Apr. 26, 2023  (KR) .................. 10-2023-0054659

(51) Int. Cl.
*G02B 21/36*   (2006.01)
*G02B 21/06*   (2006.01)
(Continued)

(52) U.S. Cl.
CPC ........... *G02B 21/361* (2013.01); *G02B 21/06* (2013.01); *H04N 13/20* (2018.05); *H04N 23/957* (2023.01)

(58) Field of Classification Search
CPC ...... G02B 21/06; G02B 21/361; H04N 13/20; H04N 23/957
(Continued)

(56) References Cited

U.S. PATENT DOCUMENTS 1,091,485 A    3/1914  Coleman
7,723,662 B2   5/2010  Levoy et al.
(Continued)

FOREIGN PATENT DOCUMENTS

KR    10-2017-0103712 A    9/2017
KR    10-2253320 B1        5/2021

OTHER PUBLICATIONS

Marc Levoy, et al., "Light Field Microscopy", ACM Transactions on Graphics 25(3), Proc. SIGGRAPH 2006.
(Continued)

*Primary Examiner* — Christopher S Kelley
*Assistant Examiner* — Ana Picon-Feliciano
(74) *Attorney, Agent, or Firm* — LRK PATENT LAW FIRM (57) ABSTRACT

Provided are a plenoptic microscope system having a structure in which a microlens array (MLA) is installed between an object and a microscope optical system and a general microscope camera is used as an image sensor, and an image processing apparatus for performing plenoptic imaging with information acquired from the same. In the plenoptic microscope system, an MLA including at least one microlens having a number of apertures (NA) similar to that of an objective lens of a microscope optical system is positioned at the front end of an incidence part of the microscope optical system and the objective lens is positioned at a focal length of the MLA or on an image plane of the MLA. The plenoptic image processing apparatus generates Plenoptic 1.0 and/or 2.0 images.

15 Claims, 6 Drawing Sheets

(51) Int. Cl.
*H04N 13/20* (2018.01)
*H04N 23/957* (2023.01)

(58) Field of Classification Search
USPC .......................................................... 348/49
See application file for complete search history.

(56) References Cited

U.S. PATENT DOCUMENTS

| | | | |
|---|---|---|---|
| 7,872,796 B2 | 1/2011 | Georgiev | |
| 8,619,177 B2 | 12/2013 | Perwass et al. | |
| 9,036,080 B2 | 5/2015 | Miyawaki | |
| 9,807,287 B2 | 10/2017 | Ng et al. | |
| 10,080,011 B1 | 9/2018 | Periasamy | |
| 2008/0180792 A1* | 7/2008 | Georgiev | G02B 21/361 |
| | | | 359/368 |
| 2012/0281072 A1* | 11/2012 | Georgiev | G03B 17/00 |
| | | | 348/E13.074 |
| 2013/0286182 A1* | 10/2013 | Dake | G02B 21/244 |
| | | | 348/79 |
| 2017/0160076 A1* | 6/2017 | Miyazaki | G02B 21/18 |
| 2018/0210173 A1* | 7/2018 | Blahnik | H04N 23/57 |
| 2019/0124318 A1 | 4/2019 | Pitts et al. | |
| 2022/0174253 A1 | 6/2022 | Kim et al. | |
| 2022/0270279 A1* | 8/2022 | Leitner | G06T 3/10 |

OTHER PUBLICATIONS

W.H.Son, et al., "Plenoptic Image Processing Technology Trends", 2016 Electronics and Telecommunications Trends. 31, 4, Aug. 2016.

Waqas Ahmad, et al., "Matching Light Field Datasets From Plenoptic Cameras 1.0 and 2.0", IEEE, Jun. 2018.

Hyun Myung Kim, et al., "Large area fabrication of engineered microlens array with low sag height for light-field maging", Optics Express 4435, vol. 27, No. 4, Feb. 18, 2019.

Viktor Eckstein, et al., "Depth-of-field comparison between the plenoptic camera 1.0 and 2.0", 2021 Society of Photo-Optical Instrumentation Engineers.

* cited by examiner

PLENOPTIC MICROSCOPE SYSTEM AND PLENOPTIC IMAGE PROCESSING APPARATUS

CROSS-REFERENCE TO RELATED APPLICATIONS

This application claims priority to and the benefit of Korean Patent Applications No. 10-2022-0120895 filed on Sep. 23, 2022 and No. 10-2023-0054659 filed on Apr. 26, 2023, the disclosures of which are incorporated herein by reference in their entirety.

BACKGROUND

1. Field of the Invention

The present invention relates to a plenoptic microscope system for three-dimensional (3D) imaging based on plenoptic technology and an image processing apparatus for generating a 3D image from information acquired from the same.

2. Description of Related Art

Plenoptic or light-field imaging is a technology for acquiring four-dimensional (4D) light field information $(x,y,\theta,\varphi)$ of light radiated from the object or scene. According to plenoptic imaging, light radiated from the object is recorded by an array of cameras or lenses having different focuses or positions and an image sensor. In other words, a three-dimensional (3D) image of the object may be acquired by recording images in different directions radiated from the object, and an image corresponding to an arbitrary viewpoint or focus may be created in this way.

Plenoptic imaging is a technology for performing 3D imaging with 3D information of the object or scene by using an optical (ray) characteristic of a lens, and is generally based on a multiple sensors or microlens array (MLA). MLA-based plenoptic imaging is a technology for acquiring parallax or position information of the object with a single image sensor through microlenses included in an MLA and restoring a 3D image of the object by using the parallax or position information. Compared to the method using multiple sensors, this MLA-based method employs a single image sensor, does not require view synchronization between image data, and may extract high-resolution depth information. Accordingly, the MLA-based plenoptic imaging is widely used in microscopes, machine visions, telescopes, general 3D cameras, etc.

Figure 1:
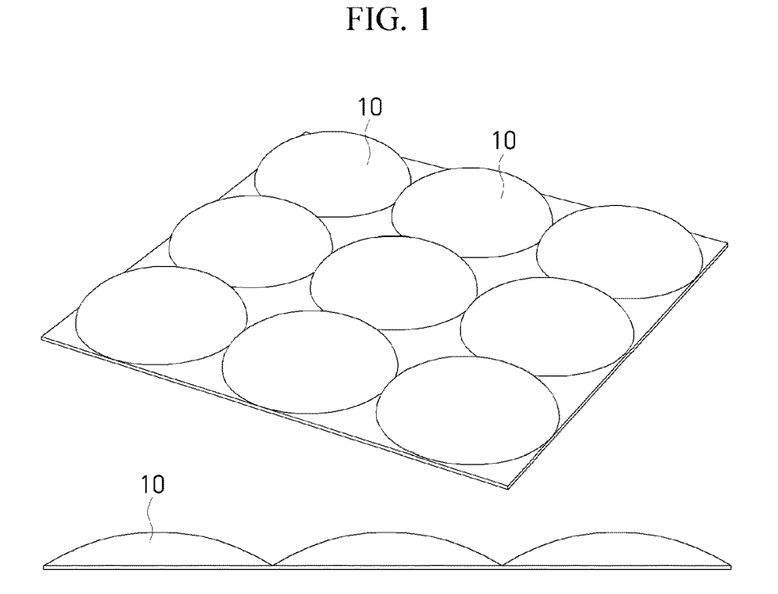
FIG. 1 is an example diagram of a microlens array (MLA)

For an MLA, multiple lenses of circular, cylindrical, quadrangular, or other shape having a diameter of a micrometer or millimeter level are arranged in a form of quadrangular, hexagonal, octagonal, etc., and polymer, glass, polydimethylsiloxane (PDMS), etc. is used as a material of the lenses. FIG. 1 illustrates an MLA in which circular microlenses 10 are arranged in a form of quadrangular. The MLA of FIG. 1 may be manufactured in various ways such as ultraviolet (UV) imprint lithography, laser direct lithography, photolithography, etc.

In a plenoptic microscope employing the MLA-based plenoptic imaging technology, unlike a general microscope including a light source, a microscope optical system (including an objective lens and a tube lens) and an image sensor, an MLA is interposed at a location between the backend of the tube lens and the image sensor, acquiring 3D information of an object output through the microscope optical system. Here, the objective lens may be an incidence unit of the microscope optical system, and the tube lens may be an exit unit.

Figure 2:
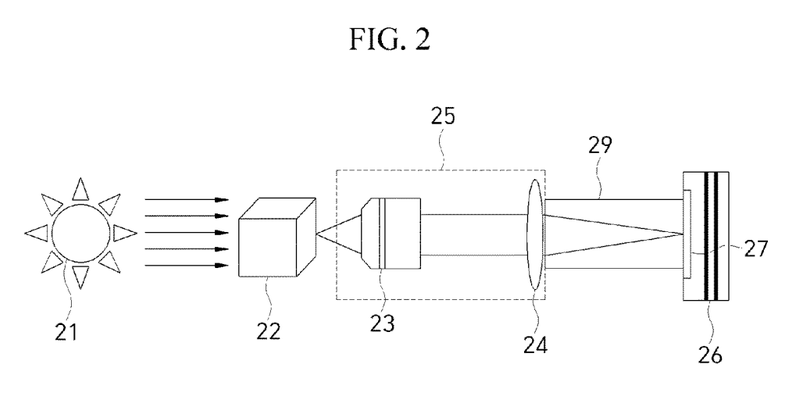
FIG. 2 is a schematic diagram of a general microscope system.
Figure 3:
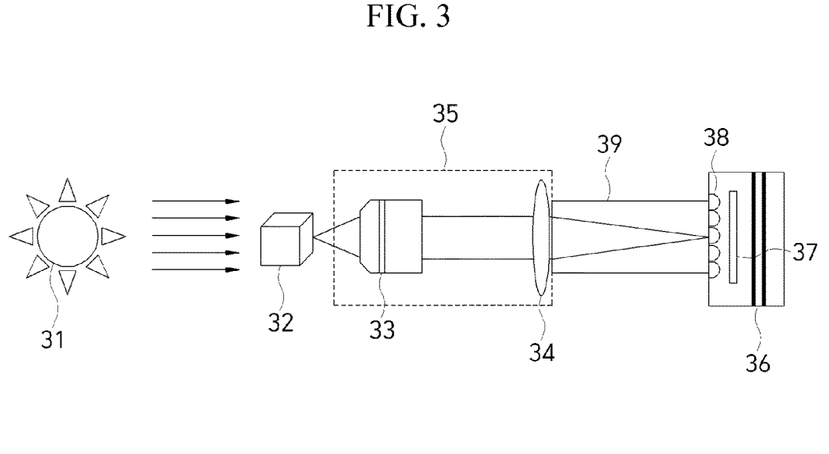
FIG. 3 is a schematic diagram of an MLA-based plenoptic microscope system.

FIG. 2 is a schematic diagram of a general microscope system, and FIG. 3 is a schematic diagram of an MLA-based plenoptic microscope system.

In a general microscope system of FIG. 2, information on one point of an object 22 is subjected to optical processing through a microscope optical system 25 which includes an incidence unit, for example, an objective lens 23, and an exit unit, for example, a tube lens 24, and acquired at one point on a 2D sensor surface of an image sensor 27 built in a camera 26. Accordingly, 3D information is lost. The information acquired (i.e., detected) in the image sensor 27 is processed by a certain image processing algorithm. (In FIG. 2, undescribed elements 21 and 29 are a light source and a camera adapter, respectively.)

On the other hand, in the MLA-based plenoptic microscope system of FIG. 3, information on one point of an object 32 is subjected to optical processing by a microscope optical system 35. After the information passes through an MLA 38, information about a different position in a Z-axis is acquired at another position of a 2D surface of an image sensor 37, so that 3D information of the object 32 may be acquired. Accordingly, when the positions of two points on one plane of the MLA 38 and the sensor surface of the image sensor 37 are obtained, a light vector is trackable through a 4 degree-of-freedom model, and thus an image of a 3D object may be restored (i.e., 3D imaging) from information detected by the image sensor 37. (In FIG. 3, undescribed elements 31, 33, 34, 36, and 39 are a light source, an objective lens, a tube lens, a plenoptic camera, and a camera adapter, respectively.)

As described above, in the existing plenoptic microscope system, an MLA is generally positioned between a microscope optical system and an image sensor. To implement this, as shown in FIG. 3, the expensive plenoptic camera 36 in which the image sensor 37 and the MLA 38 are embedded is generally attached to the microscope optical system 35 through the camera adapter 39 without any change in the microscope optical system 35.

In this case, there is a problem in that geometric characteristics, such as tilting, rotation, position, etc., and optical characteristics, such as the number of apertures (NA) of an MLA equal to the NA of a tube lens, a focal length, etc. of the MLA are determined according to the NA of the tube lens in a microscope optical system. (Even in the case of a recently developed multi-focus plenoptic system to be described below, the NA of at least one of the microlenses should be equal to the NA of the microscope optical system.)

Also, if a microscope optical system is changed, it is also necessary to change specifications of an MLA embedded in a plenoptic camera. In particular, most plenoptic cameras employ a high pixel density camera to have a high spatial resolution. In each microscope optical system, a plenoptic camera should be replaced with an appropriate plenoptic camera, which increases cost.

Also, it is significantly difficult to implement an MLA. Since the general NA of a microscope optical system is determined to be about 0.02, an MLA having a large radius should have a very low sag height (the height of microlenses measured from a substrate). Accordingly, it is difficult to implement an MLA, and image quality degradation, such as aberration, occurs.

Even in manufacturing a plenoptic camera, a focal length of an MLA should be several micrometers to several millimeters on the sensor surface of an image sensor, and accordingly an additional fixing tool and the like are necessary, which makes it difficult to manufacture a plenoptic camera.

SUMMARY OF THE INVENTION

Consequently, the present invention proposes a plenoptic microscope system and an image processing apparatus having a structure for overcoming the above-described drawbacks.

The present invention is directed to providing a plenoptic microscope system having a structure in which a microlens array (MLA) is installed between an object and a microscope optical system and a general microscope camera is used as an image sensor, and an image processing apparatus for generating a 3D object image by performing plenoptic imaging with information acquired from the same.

According to an aspect of the present invention, there is provided a plenoptic microscope system in which an MLA including at least one microlens having a number of apertures (NA) similar to that of an incidence part (e.g., an objective lens) of a microscope optical system is positioned at the front end of the incidence part of the microscope optical system, that is, between an object and the objective lens, and the objective lens is positioned on an image plane of the MLA.

This structure facilitates implementation of an MLA due to a large NA of an objective lens, and the MLA may be changed according to the magnifying power of the objective lens so that the configuration of the structure is simple. Also, it is possible to obtain a plenoptic image having a high depth resolution and spatial resolution.

In the present invention, a general image camera may be used as an image sensor. More specifically, in an existing plenoptic microscope, a plenoptic camera including an MLA and an image sensor is used as a camera for acquiring three-dimensional (3D) information, whereas, in the present invention, an MLA is installed at the front end of a microscope and a general microscope camera including a general image sensor may be used as an optical information detector for acquiring information for 3D imaging. In this way, it is possible to overcome the drawback of using an expensive plenoptic image camera, the complex configuration of a plenoptic camera, and the limitation in manufacturing an MLA imposed by a low sag height. Here, the sag height is the height of each individual microlens measured with respect to a substrate of the MLA.

According to another aspect of the present invention, there is provided a plenoptic image processing apparatus including a plenoptic imaging unit configured to generate a 3D image of an object from optical information detected by the image sensor of the plenoptic microscope system.

The plenoptic imaging unit may generate Plenoptic 1.0 and/or Plenoptic 2.0 images by processing the information detected by the image sensor.

The plenoptic image processing apparatus may further include a transfer tool control unit configured to transfer the MLA and/or an object.

A detailed configuration and operations of the present invention will become more apparent through embodiments described below with reference to drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Terminology used herein is for the purpose of describing the embodiments of the present invention and not for limiting the present invention. In the specification, singular forms include plural forms unless the content clearly indicates otherwise. Also, the terms "comprise," "comprising," etc. used herein do not preclude the presence or addition of one or more components, steps, operations, and/or elements other than stated components, steps, operations, and/or elements.

1. Prior to describing a plenoptic microscope system with a new configuration according to the present invention, the types of plenoptic microscope systems will be introduced first.

Figure 4A:
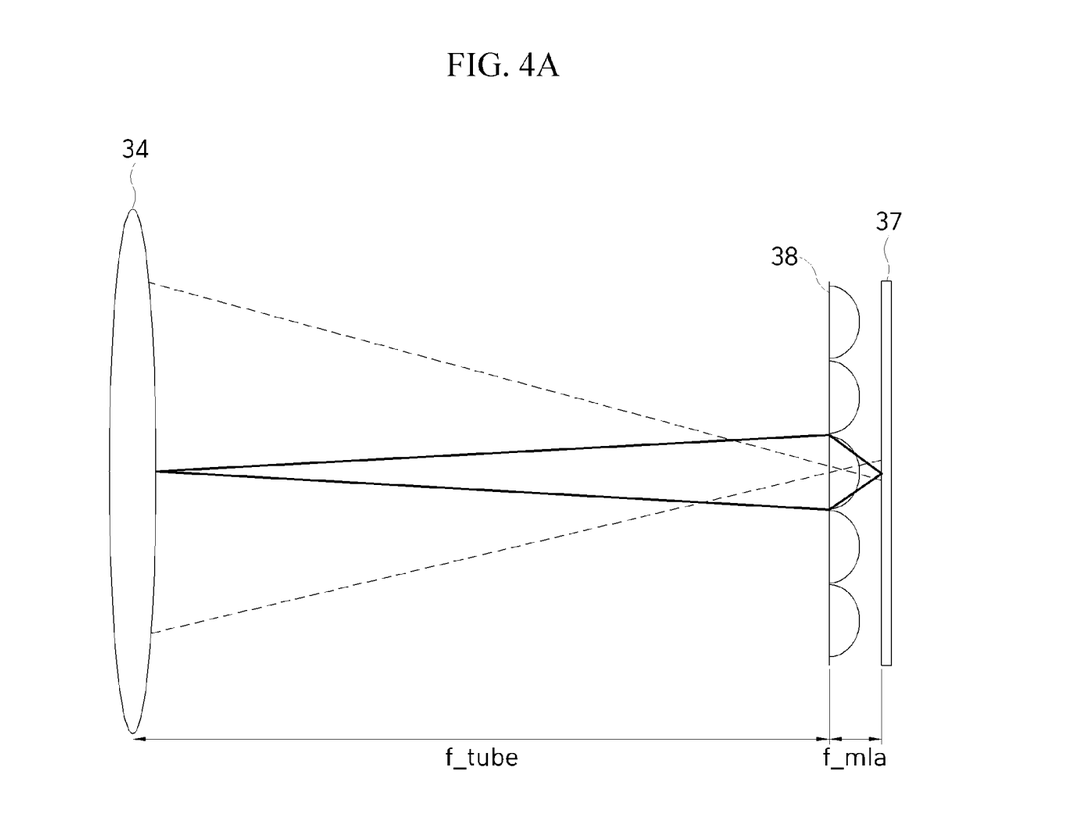
FIG. 4A is an optical diagram of a plenoptic microscope system according to Plenoptic 1.0.
Figure 4B:
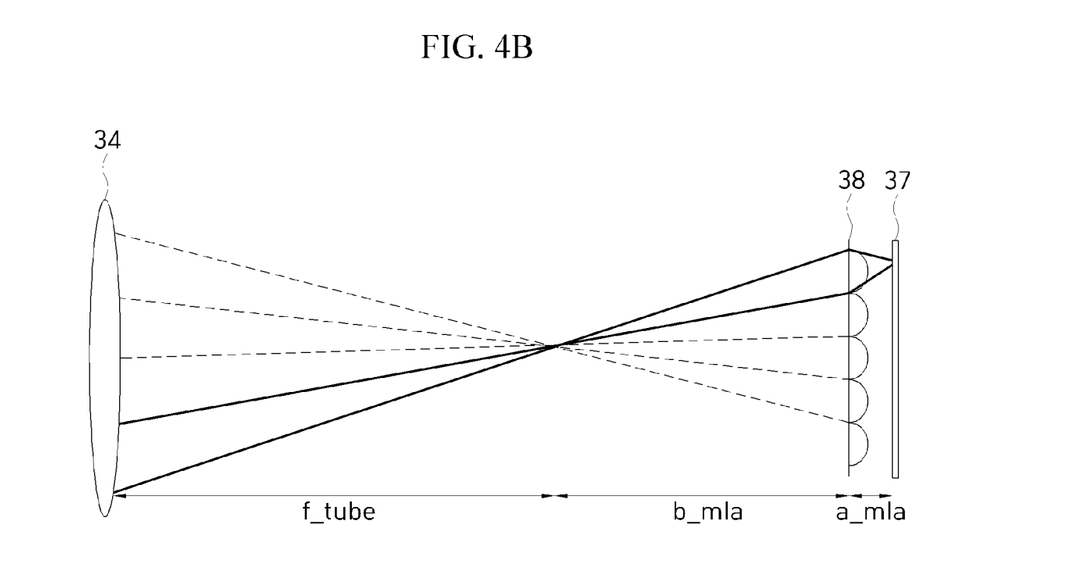
FIG. 4B is an optical diagram of a plenoptic microscope system according to Plenoptic 2.0.

FIGS. 4A and 4B are schematic optical diagrams illustrating configurational differences between different types of the existing plenoptic microscope systems. FIG. 4A shows Plenoptic 1.0, and FIG. 4B shows Plenoptic 2.0. In the existing plenoptic microscope system, an acquired image varies in shape depending on the position of a microlens array (MLA) 38 between a microscope optical system 35 (in FIG. 3) and an image sensor 37. Therefore the existing plenoptic microscope system is classified into Plenoptic 1.0 (i.e., Unfocused plenoptic) and Plenoptic 2.0 (i.e., Focused plenoptic), and different types of plenoptic image processing are performed for the types of existing plenoptic microscope systems. Here, microscope systems of Plenoptic 2.0 may be classified as Galilean and Keplerian plenoptic microscopes according to whether the MLA 38 is positioned at the front end or back end of the focal length.

Specifically, in a microscope to which Plenoptic 1.0 technology illustrated in FIG. 4A is applied, the MLA 38 having the same number of apertures (NA) as a tube lens 34 (see FIG. 3) is positioned at a focal length (f_tube) of the tube lens 34 to acquire a plenoptic image through the image sensor 37. In this case, the spatial resolution of the image is degraded, but the depth of the 3D image improves (a depth resolution increases) because a depth of focus (DoF) is represented as the square of the NA. In terms of image processing, a sub-aperture image is generated through a pixel image of each lens, and then 3D rendering of the sub-aperture image is performed with a depth image. In FIG. 4A, f_mla is a focal length of the MLA 38, and the MLA 38 is positioned at a distance of f_mla from the image sensor 37.

In the case of Plenoptic 2.0 shown in FIG. 4B, the tube lens 34 have the same NA as the MLA 38 like Plenoptic 1.0. However, unlike Plenoptic 1.0, the MLA 38 is positioned on an image plane of the tube lens 34, that is, at a position of "f_tube+b_mla", to acquire spatial information. Accordingly, Plenoptic 2.0 is also called Focused plenoptic. In FIG. 4B, f_tube is equal to f_tube shown in FIG. 4A, b_mla is a focal length of the MLA 38 toward the tube lens 34, and a_mla is a focal length of the MLA 38 toward the image sensor 37. In FIG. 4B, it is seen that the MLA 38 is at a distance of a_mla from the image sensor 37.

Plenoptic 1.0 and 2.0 differ not only in the position of the MLA 38 between the tube lens 34 and the image sensor 37 but also in an image processing method and image quality. Since Plenoptic 1.0 is affected by both the NA of a microscope system and the NA of an MLA, a depth resolution according to a DoF is good, but a spatial resolution is degraded. On the other hand, Plenoptic 2.0 is affected by the DoF of a microscope optical system and thus shows a low depth resolution but a high spatial resolution. Also, Plenoptic 1.0 obtains a 3D image according to parallax, and Plenoptic 2.0 obtains a 3D image according to distance, and therefore, different image processing algorithms should be used for them.

Recently, to improve a low depth resolution of Plenoptic 2.0, a multi-focus plenoptic camera in which an MLA is positioned on an image plane of a tube lens and the MLA and the tube lens have different NAs has been developed. Even in this multi-focus plenoptic system, of the course of the matter, the NA of at least one of microlenses should be equal to that of a microscope optical system. In addition, another technology has been proposed to improve a depth resolution of Plenoptic 2.0 by using MLAs with different focal lengths in optical structures of Plenoptic 2.0.

2. Now, the concept of a plenoptic microscope system according to the present invention will be described with reference to FIG. 5.

Figure 5:
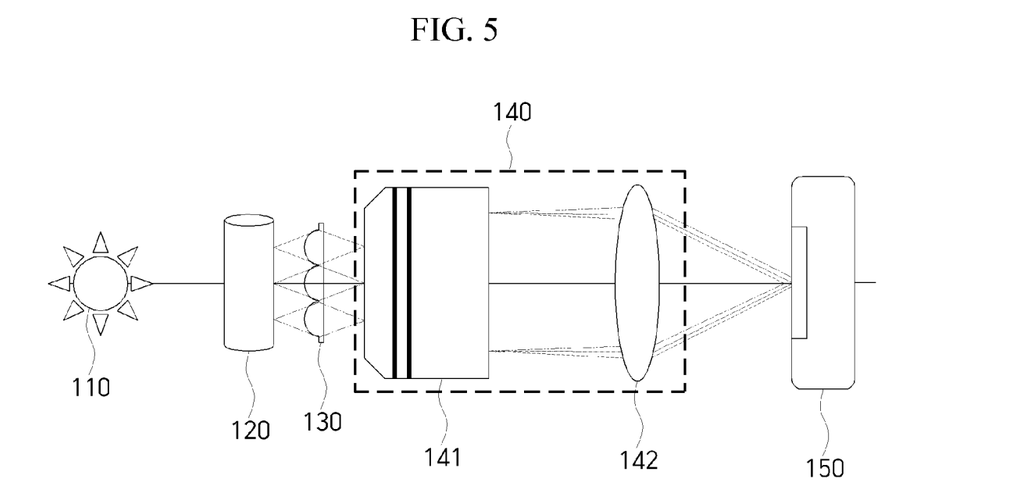
FIG. 5 is a conceptual diagram of a plenoptic microscope system according to the present invention.

With reference to FIG. 5, a microscope system includes a microscope lighting (light source) 110, an object 120, a microscope optical system 140 including an objective lens 141 and a tube lens 142, an image sensor 150, and MLA 130 positioned at a location between the object 120 and the microscope optical system 140. Here, at least one of microlenses constituting the MLA 130 has NA similar to that of the microscope optical system 140, and more preferably, has NA similar to that of the objective lens 141. The microscope optical system 140 includes the objective lens 141 and the tube lens 142, which may be composed of several lenses, and has a certain magnifying power. The several lenses may be replaced with one lens in which an incidence side and an exit side have different NAs and the same principle plane. The light source 110 may be a lighting device that may uniformly illuminate an object. The object 120 is an object having a 3D shape and may be used as a transparent specimen.

In the following description, lenses (including the objective lens 141 and the tube lens 142 described above) constituting the microscope optical system 140 are simplified as a single lens and referred to as a "main lens." Also, at least one of the microlenses constituting the MLA 130 is assumed to have an NA similar to that of the objective lens 141.

The configuration of the plenoptic microscope system shown in FIG. 5, according to the present invention, may be implemented as an embodiment corresponding to Plenoptic 1.0 (see FIG. 6) or an embodiment corresponding to Plenoptic 2.0 (see FIG. 7), in accordance with the positions of the MLA 130 and the main lens 145. Under the premise that the MLA 130 and the microscope optical system 140 have the same NA, if the objective lens 141 of the microscope optical system 140 is positioned at a focal length of the MLA 130, it is possible to acquire information for Plenoptic 1.0 imaging. Also, if the objective lens 141 of the microscope optical system 140 is positioned on an image plane of the MLA 130, it is possible to acquire information for Plenoptic 2.0 imaging. Two embodiments of Plenoptic 1.0 and Plenoptic 2.0 will be described in detail below with reference to FIGS. 6 and 7.

Figure 6:
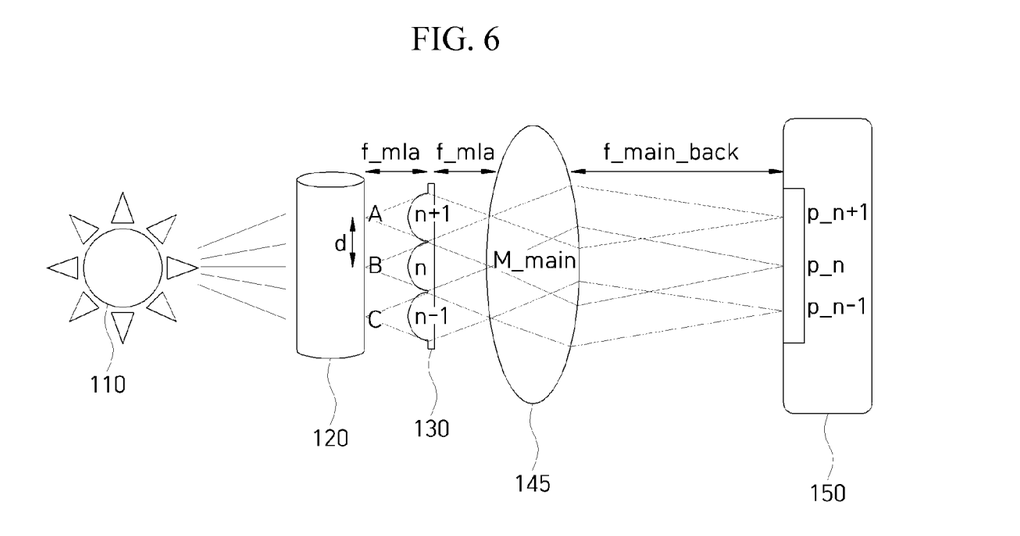
FIG. 6 is a diagram of a plenoptic microscope system according to an exemplary embodiment of the present invention.

3. FIG. 6 is an optical diagram in which the plenoptic microscope system shown in FIG. 5 is implemented according to Plenoptic 1.0 (unfocused plenoptic imaging).

In FIG. 6, when a point B on the object 120 is at a focal length of f_mla from a center n of the MLA 130, this point B is positioned at the center of a microscope lens converted into a single lens, that is, the main lens 145 defined above. An image of the point B is formed on a surface p_n of the image sensor 150 which is at a back focal length of f_main back from the main lens 145. On the other hand, an image of a point A which is at a parallax distance (surficial distance) d from the point B passes through a microlens at a position n+1 of the MLA 130 and is formed on a surface p_n+1 of the image sensor 150. Likewise, an image of a point C is formed on a surface p_n−1. Accordingly, a parallax of the object 120 is detected as a difference in position on the sensor surface of the image sensor 150.

As the configuration of FIG. 6 is similar to an optical path in which an image of an object passes through an MLA and is acquired as information for plenoptic imaging according to Plenoptic 1.0, an image processing algorithm similar to that for Plenoptic 1.0 is applicable to this embodiment. This image processing algorithm may be executed by a plenoptic image processing apparatus, which may include a plenoptic imaging unit for executing an existing Plenoptic 1.0 imaging algorithm and an existing Plenoptic 2.0 imaging algorithm or a similar algorithm thereto. Here, the focal length f_mla of the MLA 130 is equal to a front focal length of the main lens 145 because the MLA 130 and the main lens 145 are assumed to have the same NA.

Figure 7:
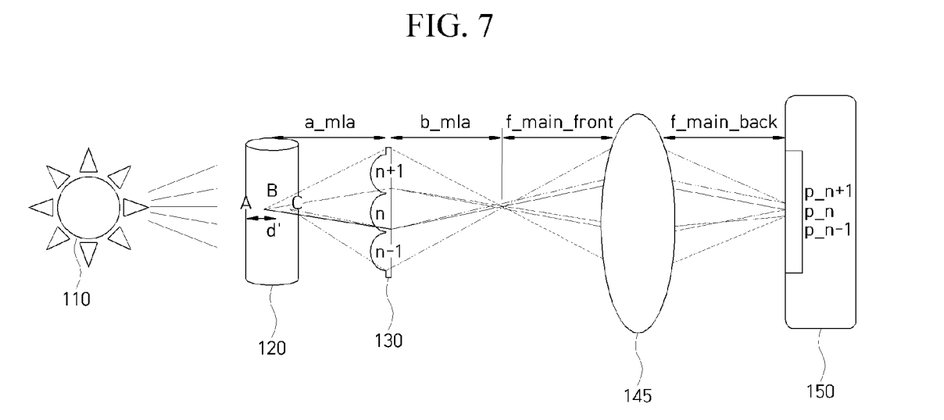
FIG. 7 is a diagram of a plenoptic microscope system according to another exemplary embodiment of the present invention.

4. FIG. 7 is an optical diagram in which the plenoptic microscope system shown in FIG. 5 is implemented according to Plenoptic 2.0 (focused plenoptic imaging).

In FIG. 7, the MLA 130 is positioned so that an image plane of a point B of the object 120 which is at a distance of a_mla from the main plane of the MLA 130 is positioned at a distance of b_mla. When the distance a_mla of this image plane is equal to a front focal length f_main front of the main lens 145, an image of the point B is formed on a surface p_n of the image sensor 150 through the main lens 145. On the other hand, an image of a point A, which is at a depth d' in the object 120, is formed on a surface p_n−1 of the image sensor 150 through a microlens n+1. An image of a point C is likewise formed on a surface p_n+1. Accordingly, a difference in depth of the object 120 is detected as a difference in position on the sensor surface of the image sensor 150.

Since the configuration of FIG. 7 is similar to an optical path of an image of the object for Plenoptic 2.0 imaging, the existing Plenoptic 2.0 image processing algorithm is applicable to this embodiment. Assuming that the main lens 145 and the MLA 130 have the same NA, a front focal length a and a back focal length b of the MLA 130 are calculated according to a lens formula shown in Equation 1 below.

$$1/a + 1/b = 1/f \qquad \text{[Equation 1]}$$

In the embodiment of FIG. 6, a DoF according to parallax is large, and thus a depth resolution is improved. On the other hand, unlike the embodiment of FIG. 6, the embodiment of FIG. 7 shows a low depth resolution but a high spatial resolution. This is because the position of the same point B is exactly detected on the sensor surface of the image sensor 150.

When NAs of microlenses constituting the MLA 130 may be designed to be different in the above two embodiments, it is possible to optimize a depth resolution and spatial resolution of a final plenoptic image.

5. Another embodiment of the present invention is shown in FIGS. 8 and 9.

According to this embodiment, the position of the MLA 130 is freely changed between the object 120 and the main lens 145, or the positions of the object 120 and the MLA 130 are freely changed. Thus an image with a high depth resolution in accordance with the embodiment of FIG. 6 is combined to an image with a high spatial resolution in accordance with the embodiment of FIG. 7, and therefore, it is possible to obtain a 3D image with an optimized depth resolution and spatial resolution.

In this embodiment, a first transfer tool 160 is used for changing the position of the MLA 130 by transferring the MLA 130. In addition to the first transfer tool 160 for transferring an MLA, or alternatively, a second transfer tool 170 for changing the position of the object 120 by transferring the object 120 may be used. In this way, it is possible to change the positions of the object 120 and the MLA 130 or change only the position of the object 120 or the MLA 130. This embodiment is appropriate for a case in which the object 120 is fixed or a moving speed of the object 120 is lower than an image acquisition speed of the image sensor 150. Since the object 120 is fixed in most microscopes, an image according to the embodiment of FIG. 6 and an image according to the embodiment of FIG. 7 may be simultaneously acquired using the MLA 130 as a zoom lens.

Figure 8:
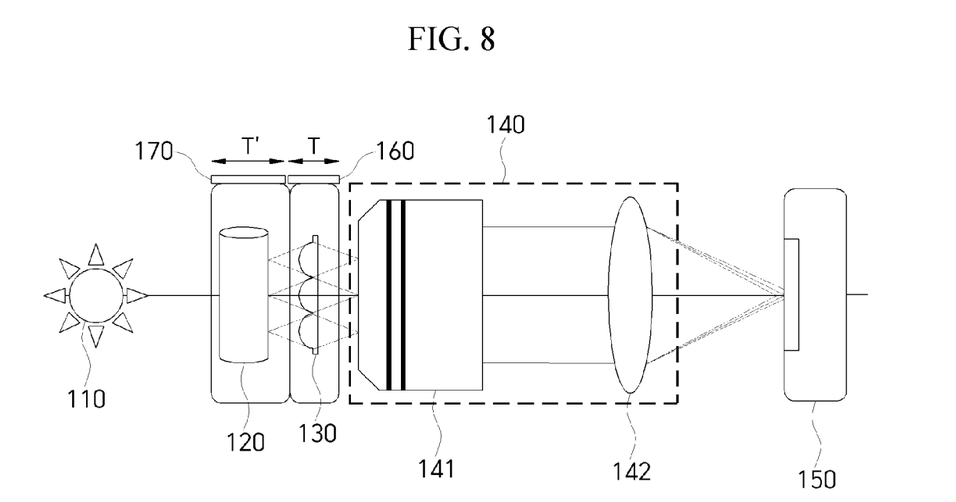
FIG. 8 is a diagram of a plenoptic microscope system according to still another exemplary embodiment of the present invention.
Figure 9:
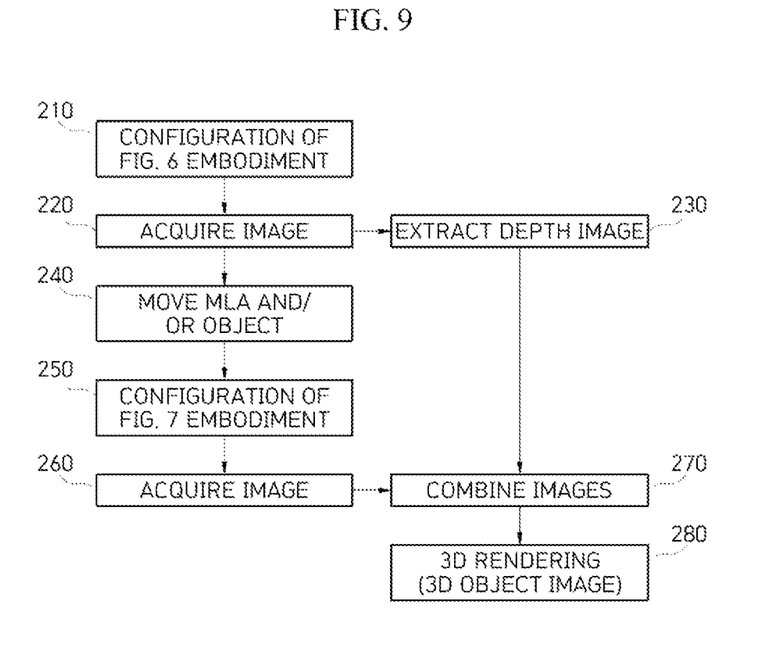
FIG. 9 is a flowchart illustrating a 3D image acquisition procedure according to the exemplary embodiment of FIG. 8.

A 3D object image rendering process for the embodiment of FIG. 8 is illustrated in FIG. 9. As described above, this process may be performed by the plenoptic image processing apparatus including the plenoptic imaging unit for executing the existing Plenoptic 1.0 imaging algorithm or a similar algorithm thereto and the existing Plenoptic 2.0 imaging algorithm or a similar algorithm thereto. Additionally, the plenoptic image processing apparatus may include a hardware- and/or software-based transfer tool control unit for controlling the first and second transfer tools 160 and 170.

Referring to FIG. 9, the plenoptic image processing apparatus configures a Plenoptic 1.0 microscope system (210) like the embodiment of FIG. 6, generates a Plenoptic 1.0 image (220), and extracts a depth image from the Plenoptic 1.0 image (230). Subsequently, the transfer tool control unit for transferring the MLA 130 and/or the object 120 changes the position of the MLA 130 and/or the object 120 (240), configures a Plenoptic 2.0 microscope system (250) like the embodiment of FIG. 7, and generates a Plenoptic 2.0 image (260). Subsequently, the depth image extracted in operation 230 is combined to the image generated in operation 260 to render a 3D object image (280).

6. Another feature of the present invention is that, even when the NA of a main lens is changed, the present invention can be implemented by adjusting the NA of a light source without changing an MLA.

In general, parallel light or uniform lighting is used as a light source for a microscope. In an existing plenoptic microscope system, an MLA is in front of an image sensor, and thus the system is not affected by the NA or effects of a light source. However, in the present invention, an MLA is between an object and a microscope optical system, and thus it is possible to adjust an NA of the MLA (NA_mla) by changing an NA of the light emitted from a light source to the object (NA_light). I.e., a total NA of the system, NA_total=NA_mla+NA_light. The NA of the light source can be easily changed by installing a light-source NA changing device, such as a lens, an iris, etc., at the front end of the light source. This can be easily performed by those with general optical knowledge.

7. A plenoptic microscope system of the present invention may be implemented as a reflective type shown in FIG. 10.

Figure 10:
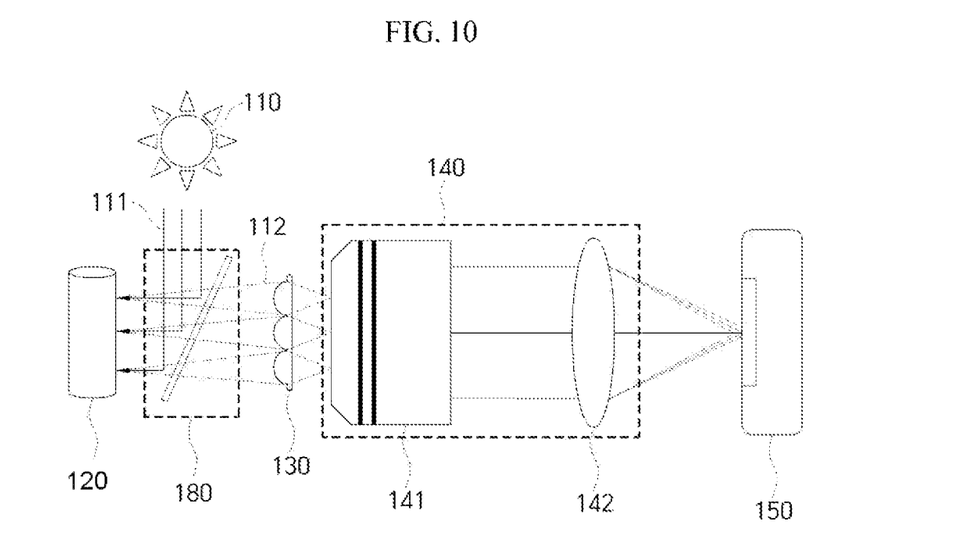
FIG. 10 is a diagram of a plenoptic microscope system according to yet another exemplary embodiment of the present invention.

While the configurations of FIGS. 5 to 8 correspond to a light transmissive plenoptic microscope system in which light emitted from a light source passes through an object, a configuration shown in FIG. 10 is a reflective plenoptic microscope system in which light 111 is emitted to an object 120 and the light (object light) 112 reflected by the object 120 is incident on an MLA 130. In such a reflective system, a beam splitter 180 is installed at the front end of the MLA 130 so that the light 111 output from a light source 110 is reflected by the beam splitter 180 and emitted to the object 120. The object light 112 reflected by the object 120 passes through the beam splitter 180 and is incident on the MLA 130. In this embodiment, it is unnecessary to make a transparent specimen as the object 120.

8. A processor and a software algorithm for controlling the above-described plenoptic microscope systems of the present invention may be implemented on the basis of a computer system illustrated in FIG. 11.

Figure 11:
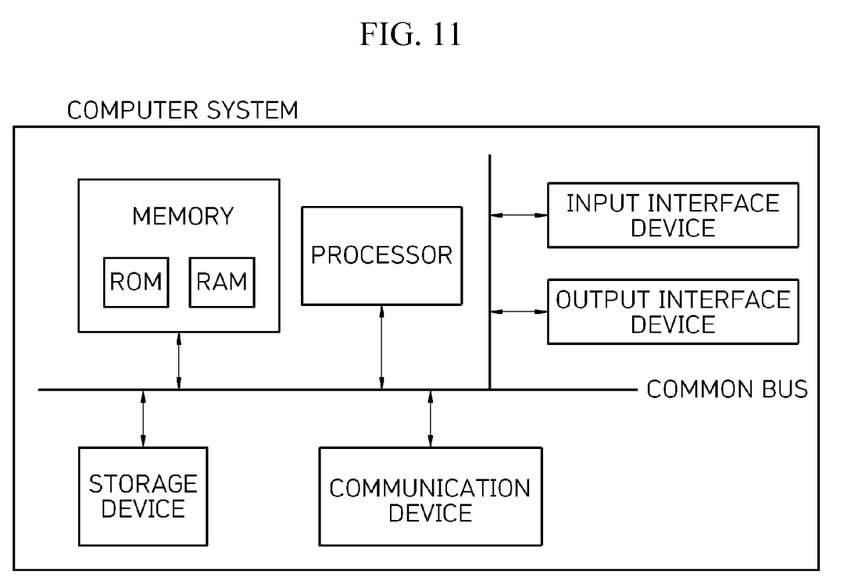
FIG. 11 is a block diagram of a computer system that is the basis of hardware and software algorithms for image processing of information acquired by a plenoptic microscope system of the present invention.

The computer system shown in FIG. 11 may include at least one of a processor, a memory, an input interface device, an output interface device, and a storage device which communicate through a common bus. The computer system may also include a communication device which is connected to a network. The processor may be a central processing unit (CPU) or a semiconductor device which executes instructions stored in the memory or a storage device. The communication device may transmit or receive a wired or wireless signal. The memory and storage device may include various types of volatile or non-volatile storage media. The memory may include a read-only memory (ROM) and a random-access memory (RAM). The memory may be inside or outside the processor and connected to the processor through one of various well-known devices.

Therefore, the present invention may be implemented as a method performed by a computer or may be implemented as a non-transitory computer-readable medium in which computer-executable instructions are stored. In an embodiment, when executed by the processor, the computer-executable instructions may perform a method according to at least one aspect described herein.

Also, a method according to the present invention may be implemented in the form of program commands that are executable by various computing devices and recorded on a computer-readable recording medium. The computer-readable recording medium may include program commands, data files, data structures, etc. solely or in combination. The program commands recorded on the computer-readable recording medium may be specially designed and configured for an embodiment of the present invention or may be known and available to those of ordinary skill in the field of computer software. The computer-readable recording medium may include a hardware device configured to store and execute program commands. Examples of the computer-readable recording medium may be magnetic media, such as a hard disk, a floppy disk, and magnetic tape, optical media, such as compact disc (CD)-ROM and a digital versatile disc (DVD), magneto-optical media, such as a floptical disk, a ROM, a RAM, a flash memory, etc. The program commands may include machine-language code generated by a compiler as well as high-level language code which is executable by a computer through an interpreter and the like.

According to the present invention, it is possible to use a general image camera rather than an existing plenoptic camera, and manufacturing an MLA is facilitated. Also, the MLA may be changed according to the magnifying power of an objective lens, and thus configuration is simple. Further, a 3D resolution and the like, that is, a depth resolution and a spatial resolution, of an obtained plenoptic image is improved, leading to an improvement in image accuracy.

Embodiments for concretely implementing the spirit of the present invention have been described above. However, the technical scope of the present invention is not limited to the above-described embodiments and drawings and is determined by reasonable interpretation of the claims.

What is claimed is:

1. A plenoptic microscope system comprising:
a light source configured to emit light radiated onto an object;
a microscope optical system on which the light radiated onto the object is incident;
a microlens array interposed between the object and the microscope optical system; and
an image sensor configured to detect light output from the microscope optical system,
wherein the microlens array comprises a plurality of microlenses with varying numerical apertures, with at least one microlens having a numerical aperture identical to that of the microscope optical system.

2. The plenoptic microscope system of claim 1, wherein the light emitted from the light source to the object passes through the object and is incident on the microlens array, wherein the object is made of a transparent specimen.

3. The plenoptic microscope system of claim 1, wherein the light emitted from the light source to the object is reflected by the object and then is incident on the microlens array, wherein the object is made of a non-transparent specimen.

4. The plenoptic microscope system of claim 3, further comprising a beam splitter configured to direct the light emitted from the light source to the object by reflecting the light and cause the light reflected by the object to be incident on the microlens array by passing the reflected light.

5. The plenoptic microscope system of claim 1, wherein the microscope optical system is positioned at a focal length of the microlens array.

6. The plenoptic microscope system of claim 1, wherein the microscope optical system is positioned on an image plane of the microlens array.

7. The plenoptic microscope system of claim 1, further comprising a first transfer tool configured to move the microlens array between the object and the microscope optical system.

8. The plenoptic microscope system of claim 1, further comprising a second transfer tool configured to change a distance between the object and the microlens array by moving the object.

9. The plenoptic microscope system of claim 1, further comprising a light-source numerical aperture changing tool configured to change a numerical aperture for the light radiated onto the object.

10. A plenoptic image processing apparatus comprising a plenoptic imaging unit configured to generate a three-dimensional (3D) image of an object from information detected by an image sensor of a plenoptic microscope system,
wherein the plenoptic microscope system comprises:
a light source configured to emit light radiated onto the object;
a microscope optical system on which the light radiated onto the object is incident;
a microlens array interposed between the object and the microscope optical system; and
the image sensor configured to detect information output from the microscope optical system,
wherein the microlens array comprises a plurality of microlenses with varying numerical apertures, with at least one microlens having a numerical aperture identical to that of the microscope optical system.

11. The plenoptic image processing apparatus of claim 10, wherein the microscope optical system of the plenoptic microscope system is positioned at a focal length of the microlens array, and
the plenoptic imaging unit generates a Plenoptic 1.0 image by processing the information detected by the image sensor.

12. The plenoptic image processing apparatus of claim 10, wherein the microscope optical system of the plenoptic microscope system is positioned on an image plane of the microlens array, and
the plenoptic imaging unit generates a Plenoptic 2.0 image by processing the information detected by the image sensor.

13. The plenoptic image processing apparatus of claim 10, wherein the plenoptic imaging unit generates a Plenoptic 1.0 image by processing the information detected by the image sensor, extracts a depth image from the Plenoptic 1.0 image, generates a Plenoptic 2.0 image by processing the information detected by the image sensor, and renders a final 3D object image by combining the depth image extracted from the Plenoptic 1.0 image to the Plenoptic 2.0 image.

14. The plenoptic image processing apparatus of claim 10, wherein the plenoptic microscope system further comprises a first transfer tool configured to move the microlens array between the object and the microscope optical system, and
the plenoptic image processing apparatus further comprises a transfer tool control unit configured to move the microlens array between the object and the microscope optical system by driving the first transfer tool.

15. The plenoptic image processing apparatus of claim 10, wherein the plenoptic microscope system further comprises a second transfer tool configured to change a distance between the object and the microlens array by moving the object, and the plenoptic image processing apparatus further comprises a transfer tool control unit configured to drive the second transfer tool in order to change the distance between the object and the microlens array by moving the object.

\* \* \* \* \*